UNITED STATES PATENT OFFICE.

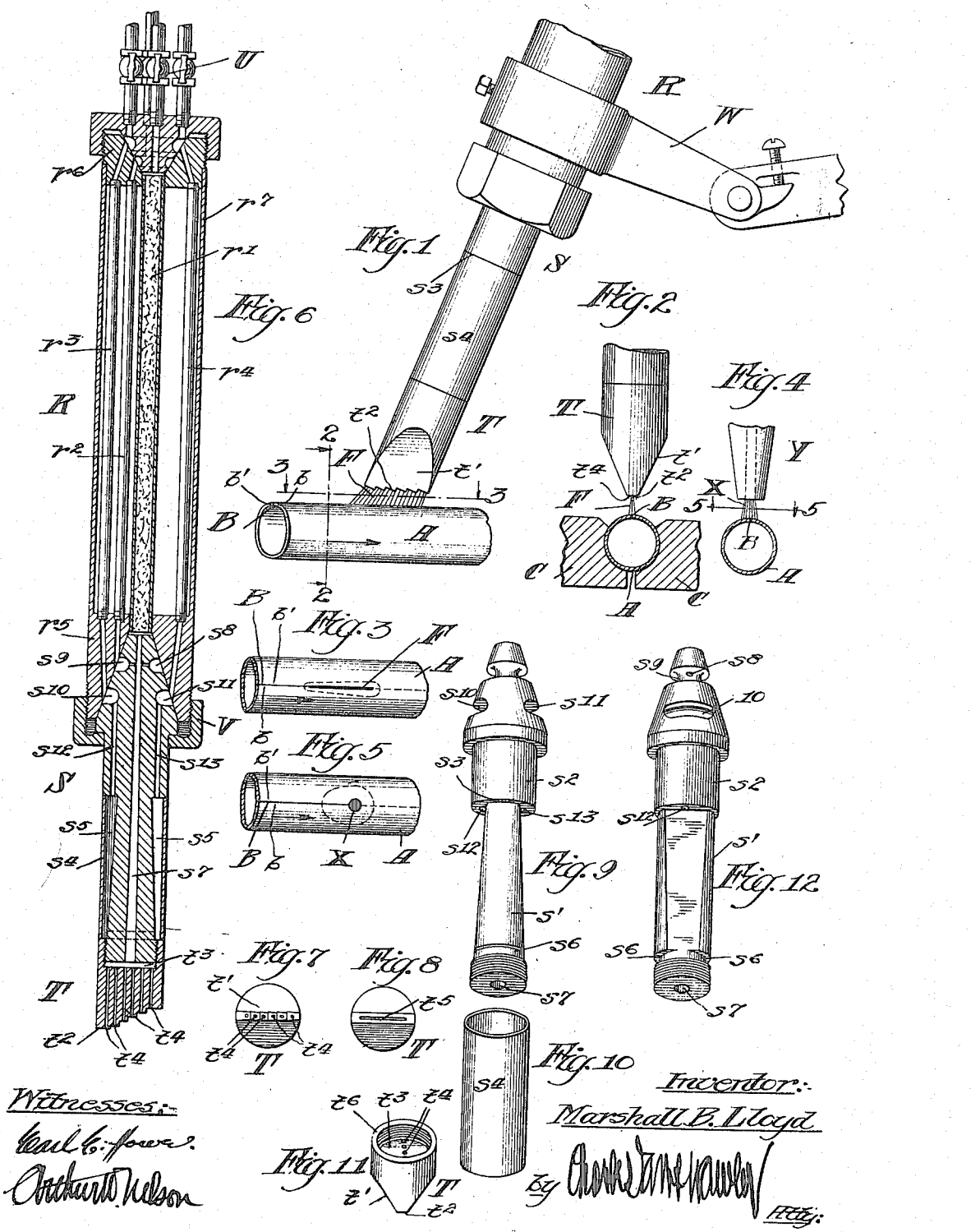

MARSHALL BURNS LLOYD, OF MENOMINEE, MICHIGAN, ASSIGNOR, BY MESNE ASSIGNMENTS, TO THE ELYRIA IRON & STEEL COMPANY, A CORPORATION OF OHIO.

ART OF WELDING.

1,141,068.           Specification of Letters Patent.      Patented May 25, 1915.

Application filed November 10, 1914. Serial No. 871,246.

*To all whom it may concern:*

Be it known that I, MARSHALL B. LLOYD, a citizen of the United States, residing at Menominee, county of Menominee and State of Michigan, have invented certain new and useful Improvements in the Art of Welding, of which the following is a specification.

My invention relates generally to the art of gas-flame welding, and has special utility in the manufacture of substantially seamless tubing from longitudinally butt-seamed tubing.

Heretofore the best and most economical practice has consisted in playing a relatively small flame of oxy-acetylene gas upon the seam at a single point, while holding the seam edges together at that point and moving the tube longitudinally to effect progressive welding. With the gas at given pressure, the rapidity with which a tube of given proportions may be thus welded, is determined by the size of the gas jet, that dimension fixing the quantity of the heat supplied at the single point of attack. The seam of the tube is narrow; a mere line. A weld cannot be effected by a single-point flame limited to this line, because of the rapid dissipation of the heat in the moving metal. Hence a single-point jet flame is always much wider than the seam; and it follows that most of the heat is expended upon the body of the tube rather than directly upon the seam edges. When a large jet is used in an attempt to form the weld more rapidly, the cost of the gas is disproportionate to the value of the resultant product. And so it is customary to restrict the size of the gas jet and accept a relatively slow production of tubing, in order that the cost thereof may be kept within commercial limits. Thus in every practical sense the speed at which welded tubing may be produced by former methods is determined by the quantity of oxy-acetylene or like gas that can be economically applied through a single-point jet or torch. In such single-point welding there is a noticeable burning and waste of metal, due to the excessive temperature at the center of the flame. Furthermore, the weld is wavy and presents an objectionably rough bur. The action is not a mere quiet fusing and flowing together of the seam edges; on the contrary, the force of the jet disturbs and displaces the metal that is melted at the sides of the seam, and the displaced metal does not resume its initial condition before it cools; hence the roughness of the weld.

The object of my invention is to accomplish the welding operation more rapidly without adding to the quantity of gas consumed, or to weld the tubing as rapidly as at present but with less gas, and thus in either case to reduce the cost of the product. Also, as will be understood from the following description, my invention makes it possible to greatly increase the welding speed by slightly increasing the gas consumption.

Further objects of my invention are to avoid the described waste of metal, and to so modify the action of the welding flame as to prevent the disturbance of the metal and insure a uniform weld and weld bur.

With the foregoing objects in view, my invention consists in progressively applying and narrowly limiting to the seam edges a lineally extending multiple-point welding flame and thereby gradually and quietly, but in the sum, rapidly heating and fusing the seam edges and causing them to flow together. By so applying the heat and limiting the region of its effect, I accomplish the weld with a minimum of heat, yet hasten the operation, avoid melting metal which properly should remain stable, dispense with such volume and velocity of gas as would cause either the burning or the displacement of metal, and insure a uniform and smoothly welded seam, substantially without a weld bur, except where the edges are pressed together and upset, as is sometimes done to secure a thick weld.

My invention is carried out in the manner and by the novel means hereinafter fully described and distinctly pointed out, all of which will be readily understood upon reference to the drawings that form part of this specification and which depict my novel apparatus in a preferred form.

Figure 1 of the drawings shows a section of butt-seamed tubing under the action of the multiple-point welding flame; Fig. 2 is a sectional view on the line 2—2 of Fig. 1, showing also the tube holder; Fig. 3 is a plan view on the line 3—3 of Fig. 1 depicting the nature and position of the multiple-point welding flame with respect to the seam of the tubing; Fig. 4 is like unto Fig. 2 but shows the nature and position of the common single-point welding flame; Fig. 5 is a plan view on the plane 5—5 of Fig. 4; Fig.

6 is an enlarged longitudinal section of the novel torch shown in Fig. 1; Fig. 7 is an end view of the torch tip or nozzle showing the member and relation of the component jet openings of the multiple-point port therein; Fig. 8 shows another of the many possible forms of my multiple-point torch tip, the several jet openings of Fig. 7 being, in Fig. 8, merged in a single slit-like jet opening; Fig. 9 is a perspective view of the shank of the torch; Fig. 10 is a perspective view of the outer shell of said shank; Fig. 11 is a perspective view of the tip; and, Fig. 12 is a side view of the torch shank.

In Figs. 1 to 5, inclusive, A in each case represents a pre-formed tube having an initially open seam, B, formed by the abutting longitudinal seam-edges, $b'$, $b'$. As is usual in this art, the seam edges are held in firm contact or abutment during the welding operation, as by means of the holder, C, (Fig. 2) through which longitudinal movement is imparted to the tube. The arrows in Figs. 1, 3, and 5, show the direction of movement. Obviously the progressive action may be secured by moving the flame while the tube is held in position, but it is preferable that the torch shall be fixed and that the constant speed forward movement shall be imparted to the metal. To unite the seam edges, $b$, $b$, it is common practice to employ an oxy-acetylene gas jet or flame of circular cross section. Such a gas jet is shown in Fig. 4,—Y, being the torch tip; and, X, the flame. Such a flame (X) when sufficient to fuse the edges of the moving tube, is necessarily much wider than the seam; therefore, as indicated in Figs. 4 and 5, its field or region of action extends widely across the top of the tube. The dotted lines of Fig. 5 approximately indicate the portion of the moving tube which is intensely heated by a single-point flame. The objectionable features and incidents of such single-point welding have been set forth above and need not be repeated.

As shown in Figs. 1, 2, and 3, the welding flame F which I use is but little wider than the seam to be welded but acts upon a relatively great length of the seam, its region of action or intense heat being approximately as shown by the dotted lines of Fig. 3. In other words, I apply the welding flame in a new manner, and in so doing I greatly enlarge the action of the burning gas upon the seam, measured longitudinally, and at the same time I restrict the intense heat substantially to the extreme seam edges. Consequently, the temperature of the metal is very gradually, but continuously, raised as it passes the flame. By extending or distributing the welding heat longitudinally, in a unitary flame, I assure a gradual and yet very rapid increase in temperature up to the welding point. By restricting the lateral dispersion of the heat I avoid waste of gas and fuse only the extreme edges of the seam, and I thus insure a uniform weld and a minimum disturbance of the metal. It will be clear that by my method a reasonably gradual welding is substituted for the old attempted instantaneous welding. By applying heat only where it is needed I avoid heat losses which are characteristic of the old method; and by avoiding these losses I weld more rapidly, with a given quantity of gas. It follows, that I am able very greatly to increase the speed of welding by very slightly increasing the gas consumption. I also find that seams which are thus united are welded to their full depth. Also that the piercing of the metal by the flame is substantially done away with. Obviously, the novel process here described is adapted to many uses.

Varied means may be used for so applying the heat. I prefer to use the means shown in the drawings; that is, a gas torch which emits a multiple-point welding flame. This novel torch comprises three main parts, namely, a tip T, a shank S, and a stock R. The tip T may be in the main cylindrical, with a wedge shaped point $t'$. For convenience, the torch is mounted at an acute angle to the work, as shown in Fig. 1; and when this is the case, I form the extreme point or edge $t^2$ on an angle which will present the same on a line parallel with the seam to be welded. This consideration is clearly shown in Fig. 1 and Fig. 6. When in use the wedge shaped point is positioned in line with the seam in the metal, as made clear by Figs. 1, 2, and 3. The tip is characterized by a gas distributing chamber $t^3$ and by a multiple-point port, the latter being in the middle plane of the tip. This port, as shown in Figs. 6, 7, and 11, may comprise a series of relatively minute ducts or jet openings $t^4$, each of a diameter approximating the width of the seam to be welded. Or, as shown in Fig. 8, the multiple-point port may take the form of a long, narrow slit $t^5$. In either case the tip will emit the desirable longitudinally extended, thin, multiple-point welding flame. The office of the shank S is to conduct gas to the chamber $t^3$, of the tip, and to keep the tip cool. The tip is detachable from the shank, being screw-threaded thereon, as shown in Figs. 6, 9, and 11. The lower part $s'$ of the shank is initially cylindrical; the upper part $s^2$ is larger, presenting a shoulder $s^3$. A thimble or shell $s^4$, centered by the part $s'$, is confined between the shoulder $s^3$ and the rim $t^6$ of the tip. The joints are made tight by screwing the tip firmly on the shank. As shown, opposite sides of the portion $s'$ are cut away or flattened and thus spaces $s^5$, $s^5$, are formed within the shell $s^4$. These spaces are connected at the bottom (next to the tip) by cross grooves $s^6$ in the portion $s'$. The gas duct $s^7$ extends from end to end of the shank, as clearly shown in Fig. 6. It has no communication with the spaces $s^5$, $s^6$. Mixing ducts $s^8$ open from the duct $s^7$ into a circumferential groove $s^9$ in the upper end of the shank. Below that groove I provide two non-communicating recesses $s^{10}$ and $s^{11}$, which are connected with the spaces $s^5$ by respective ducts $s^{12}$ and $s^{13}$. These are water ducts for supplying water to the spaces $s^5$, $s^5$ of the hollow shank, to cool the same and the tip T. The component gases, to make the burning mixture, enter the upper end of the duct $s^7$ and the groove $s^9$, respectively, and are mixed in the duct $s^7$. The latter is preferably enlarged toward its discharge end, permitting some expansion of the gas mixture before it reaches the distributing chamber $t^3$.

The stock R carries the valve-connection U of the several gas and water supply pipes, and contains the extensions thereof, whereby communication is established with respective ducts in the shank. Thus $r'$ is the safety filter gas connection with the ducts $s^7$; and $r^2$ is the connection with the groove $s^9$ and mixing ducts $s^8$; and, $r^3$ and $r^4$ are the water connections for the recesses $s^{10}$ and $s^{11}$. The stock is provided with heads $r^5$ and $r^6$, connected by a barrel $r^7$, which incloses the several pipes $r'$, $r^2$, $r^3$, $r^4$. For convenience, the juncture portions are made conical and the shank S is secured to the stock by a union joint V, all as clearly shown in Fig. 6. The junctions may be of other forms, if desired.

In practice the torch is supported by a swivel bracket W, fixed above the work holder C. It will be understood that in operation the gas, under suitable pressure, is ignited at the tip, positioned as in Fig. 1. The holder C, being in motion, is supplied with tubing, positioned therein as indicated in Fig. 2, and feeds the same forward to the flame at a constant rate of speed.

I do not claim in this application the novel apparatus described, that being the subject matter of my divisional application, Serial No. 876,846, filed December 12, 1914.

Having thus described my invention, I claim as new and desire to secure by Letters Patent:—

The improvement, in the herein described art, that consists in progressively applying and narrowly limiting to the seam-edges a lineally extending welding flame and thereby gradually heating and fusing the seam edges and causing them to flow quietly together.

In testimony whereof, I have hereunto set my hand, this 28th day of October, 1914, in the presence of two subscribing witnesses.

MARSHALL BURNS LLOYD.

Witnesses:
   Geo. C. W. Klippel,
   J. J. Van Dreese.